United States Patent
Hata et al.

(10) Patent No.: US 10,000,198 B2
(45) Date of Patent: Jun. 19, 2018

(54) CONTROL SYSTEM AND CONTROL METHOD

(71) Applicant: TOYOTA JIDOSHA KABUSHIKI KAISHA, Toyota-shi, Aichi-ken (JP)

(72) Inventors: Kensei Hata, Susono (JP); Makoto Funahashi, Gotemba (JP); Yuji Iwase, Mishima (JP); Yosuke Suzuki, Susono (JP); Seitaro Nobuyasu, Susono (JP); Koichi Watanabe, Susono (JP); Shojiro Oya, Numazu (JP); Yuta Oshiro, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 15/024,763

(22) PCT Filed: Sep. 25, 2014

(86) PCT No.: PCT/IB2014/001922
§ 371 (c)(1),
(2) Date: Mar. 24, 2016

(87) PCT Pub. No.: WO2015/044754
PCT Pub. Date: Apr. 2, 2015

(65) Prior Publication Data
US 2016/0229387 A1    Aug. 11, 2016

(30) Foreign Application Priority Data
Sep. 26, 2013 (JP) .................... 2013-199275

(51) Int. Cl.
*B60W 10/06* (2006.01)
*B60W 20/10* (2016.01)
(Continued)

(52) U.S. Cl.
CPC ............ *B60W 20/10* (2013.01); *B60K 6/365* (2013.01); *B60K 6/387* (2013.01); *B60K 6/442* (2013.01);
(Continued)

(58) Field of Classification Search
CPC ..... Y10T 477/26; B60W 20/10; B60W 10/06; B60W 10/08; B60W 10/02; B60W 20/40;
(Continued)

(56) References Cited

U.S. PATENT DOCUMENTS

| | | | |
|---|---|---|---|
| 5,788,006 A | 8/1998 | Yamaguchi | |
| 6,176,807 B1 * | 1/2001 | Oba | B60K 6/365 180/65.25 |

(Continued)

FOREIGN PATENT DOCUMENTS

| | | |
|---|---|---|
| DE | 102007047805 A1 | 5/2009 |
| DE | 102007055829 A1 | 6/2009 |

(Continued)

*Primary Examiner* — Roger L Pang
(74) *Attorney, Agent, or Firm* — Oliff PLC

(57) ABSTRACT

In a control system and a control method, an electronic control unit is configured to crank an engine by setting a clutch to a half engaged state in a state where operation of the engine is stopped during traveling. The half engaged state is a state where the clutch is engaged with a slip. The electronic control unit is configured to, after a rotation speed of the engine has reached an ignition permission rotation speed or higher, increase a transmitted torque capacity of the clutch to a transmitted torque capacity that satisfies the following conditions i) and ii): i) the transmitted torque capacity is larger than a transmitted torque capacity before the rotation speed of the engine has reached the ignition permission rotation speed; and ii) the transmitted torque capacity allows the clutch to be kept in the half engaged state.

12 Claims, 10 Drawing Sheets

(51) Int. Cl.
| | |
|---|---|
| *B60K 6/365* | (2007.10) |
| *B60K 6/445* | (2007.10) |
| *B60K 6/48* | (2007.10) |
| *B60W 10/02* | (2006.01) |
| *B60W 10/08* | (2006.01) |
| *B60W 20/00* | (2016.01) |
| *B60W 30/20* | (2006.01) |
| *F16D 48/06* | (2006.01) |
| *B60W 20/40* | (2016.01) |
| *B60W 30/18* | (2012.01) |
| *B60K 6/387* | (2007.10) |
| *B60K 6/442* | (2007.10) |
| *B60K 6/54* | (2007.10) |
| *F16H 3/72* | (2006.01) |
| *F16H 37/08* | (2006.01) |

(52) U.S. Cl.
CPC ............... *B60K 6/445* (2013.01); *B60K 6/48* (2013.01); *B60K 6/54* (2013.01); *B60W 10/02* (2013.01); *B60W 10/06* (2013.01); *B60W 10/08* (2013.01); *B60W 20/00* (2013.01); *B60W 20/40* (2013.01); *B60W 30/18018* (2013.01); *B60W 30/20* (2013.01); *F16D 48/06* (2013.01); *F16H 3/725* (2013.01); *F16H 3/728* (2013.01); *F16H 37/0833* (2013.01); *B60W 2510/0241* (2013.01); *B60W 2510/0275* (2013.01); *B60W 2510/0638* (2013.01); *B60W 2710/021* (2013.01); *B60W 2710/025* (2013.01); *B60W 2710/027* (2013.01); *B60W 2710/083* (2013.01); *B60W 2720/30* (2013.01); *B60Y 2200/92* (2013.01); *B60Y 2300/182* (2013.01); *F16D 2500/3067* (2013.01); *F16D 2500/50227* (2013.01); *F16D 2500/7041* (2013.01); *F16D 2500/7044* (2013.01); *F16D 2500/70252* (2013.01); *F16D 2500/70282* (2013.01); *F16D 2500/70426* (2013.01); *Y02T 10/6221* (2013.01); *Y02T 10/6239* (2013.01); *Y02T 10/6286* (2013.01); *Y10S 903/93* (2013.01); *Y10T 477/26* (2015.01)

(58) Field of Classification Search
CPC ........... B60W 2510/0638; B60K 6/442; B60K 6/387; B60K 6/54
See application file for complete search history.

(56) References Cited

U.S. PATENT DOCUMENTS

| | | | |
|---|---|---|---|
| 6,190,282 B1* | 2/2001 | Deguchi | B60K 6/442 180/65.23 |
| 8,326,475 B2* | 12/2012 | Yoshida | B60K 6/365 701/22 |
| 9,175,658 B2* | 11/2015 | Gibson | B60W 10/02 |
| 9,758,161 B2* | 9/2017 | Hata | B60W 20/40 |
| 2005/0121239 A1 | 6/2005 | Tsuneyoshi et al. | |
| 2007/0087894 A1 | 4/2007 | Tsuneyoshi et al. | |
| 2009/0312144 A1 | 12/2009 | Allgaier et al. | |
| 2015/0329104 A1* | 11/2015 | Takamura | B60K 6/48 701/22 |

FOREIGN PATENT DOCUMENTS

| | | |
|---|---|---|
| DE | 102008002383 A1 | 12/2009 |
| EP | 1 574 378 A2 | 9/2005 |
| JP | H08-295140 A | 11/1996 |
| JP | 3912368 B2 | 5/2007 |
| JP | 4424245 B2 | 3/2010 |

\* cited by examiner

| TRAVEL MODE | K0 CLUTCH ENGAGED: O RELEASED: — |
|---|---|
| DISCONNECT EV MODE | — |
| ORDINARY EV MODE | O |
| HV MODE | O |

CONTROL SYSTEM AND CONTROL METHOD

BACKGROUND OF THE INVENTION

1. Field of the Invention

The invention relates to a control system and control method for a vehicle equipped with an engine that is started up by cranking (or motoring) and, more particularly, to a control system and control method that control a clutch that is engaged to start up the engine and a motor for cranking.

2. Description of Related Art

An internal combustion engine, such as a gasoline engine and a diesel engine, which is used as a driving force source of a vehicle autonomously rotates by igniting fuel that is supplied in a state where the rotation speed is increased to a predetermined rotation speed. A vehicle that uses only an internal combustion engine as a driving force source needs such so-called start-up control. Therefore, the vehicle that uses only the internal combustion engine as the driving force source keeps the engine in an idling state even when the vehicle is stopped. However, idling during a stop of the vehicle deteriorates fuel economy and increases exhaust gas, so the engine is stopped when the vehicle does not require large driving force, including the case during a stop of the vehicle.

An example of a vehicle that is able to execute engine stop control is a hybrid vehicle that uses a motor or a motor generator (these are collectively referred to as motor) in addition to an engine as a driving force source. The motor has a torque capacity so as to be able to output driving force for propelling the vehicle. Therefore, when the engine that is stopped during traveling is restarted, the motor is allowed to be sufficiently used as a power source for engine cranking. On the other hand, when the operation of the engine is stopped during traveling, energy is consumed by co-rotating the engine, and the consumed energy becomes a loss. In order to avoid such an energy loss, the engine may be disconnected from the motor or a power transmission mechanism by releasing a clutch.

When the engine is started up, there is a possibility that torque becomes unstable because torque is consumed for cranking the engine, an engine rotation speed becomes unstable at a start-up initial state, and the like, with the result that vibrations or noise deteriorates. A method for suppressing such an inconvenience is described in Japanese Patent No. 3912368. The method will be simply described. When start-up of an engine is required in a state where a hybrid vehicle is carrying out motor running by using a motor as a driving force source, a clamping force of a clutch is gradually increased, and cranking of the engine is started. In the initial stage of an increase in the clamping force of the clutch, because the clamping force of the clutch is smaller than a clamping force that is required to rotate the engine, the clutch is in a slip state. After that, the clamping force of the clutch sufficiently increases, and then the engine is rotated. In this process, the input-side rotation speed and output-side rotation speed of the clutch become equal to each other, and no slip occurs in the clutch, so the clutch is substantially completely engaged. When the engine rotation speed becomes a start-up rotation speed, a start-up command is issued to, for example, start supplying fuel to the engine. At the same time, the clamping force of the clutch is kept at the clamping force at that timing or reduced from the clamping force at that timing. As a result, when the engine begins to start up and the output torque fluctuates, a slip of the clutch occurs because the clamping force of the clutch is smaller than a peak torque. Therefore, engine torque that unstably fluctuates is not directly transmitted to drive wheels, so vibrations are suppressed.

In a so-called two-motor-type hybrid vehicle, a clutch that is able to disconnect an engine from a power transmission line is described in Japanese Patent Application Publication No. 08-295140 (JP 08-295140 A).

The method described in Japanese Patent No. 3912368 substantially completely engages the clutch until the engine rotation speed becomes a startable rotation speed, and rotates the engine by torque that is transmitted via the clutch. Therefore, if the engine rotation speed is rapidly increased, large torque is required, so this may influence driving torque and becomes a factor of shock. A change in torque increases in the case where an increase in the clamping force of the clutch is stopped and then the clamping force is kept or reduced, so this may become a factor of shock. Such inconveniences reduce the clamping force of the clutch, and it is possible to avoid or suppress a reduction in the clamping force by reducing the rate of increase in engine rotation speed accordingly. However, with such control, a time until the engine rotation speed reaches the startable rotation speed extends, so start-up response is impaired.

In the method described in Japanese Patent No. 3912368, after the engine rotation speed has reached the startable rotation speed, the clamping force of the clutch is kept at the clamping force at that timing or reduced from the claiming force at that timing, so a time during which the engine torque or the engine rotation speed is unstable extends. In other words, a time extends until substantial completion of engine start-up at which the engine rotation speed is stable, so there is room for improvement in the start-up response of the engine in terms of this point as well.

SUMMARY OF THE INVENTION

The invention relates to a control system and control method that are able to quickly complete start-up of an engine without causing a feeling of strangeness, such as shock, in starting up the engine by engaging a clutch to increase an engine rotation speed.

A control system according to the invention includes the following configuration. The control system includes an engine, a clutch and an electronic control unit. The engine is configured to start up by cranking. The clutch is configured to transmit cranking torque to the engine when engaged. The clutch is configured so as to continuously change its transmitted torque capacity. The electronic control unit is configured to crank the engine by setting the clutch to a half engaged state in a state where operation of the engine is stopped during traveling. The half engaged state is a state where the clutch is engaged with a slip. The electronic control unit is configured to, after a rotation speed of the engine has reached an ignition permission rotation speed or higher, increase the transmitted torque capacity of the clutch to a transmitted torque capacity that satisfies the following conditions i) and i) the transmitted torque capacity is larger than a transmitted torque capacity before the rotation speed of the engine has reached the ignition permission rotation speed; and ii) the transmitted torque capacity allows the clutch to be kept in the half engaged state.

A control method for a vehicle according to the invention includes the following configuration. The vehicle includes an engine, a clutch and an electronic control unit. The engine is configured to start up by cranking. The clutch is configured to transmit cranking torque to the engine when engaged. The clutch is configured so as to continuously change its transmitted torque capacity. The control method includes: cranking, by the electronic control unit, the engine by setting the clutch in a half engaged state in a state where operation of the engine is stopped during traveling, the half engaged state being a state where the clutch is engaged with a slip; and, after a rotation speed of the engine has reached an ignition permission rotation speed or higher, increasing, by the electronic control unit, the transmitted torque capacity of the clutch to a transmitted torque capacity that satisfies the following conditions i) and ii): i) the transmitted torque capacity is larger than a transmitted torque capacity before the rotation speed of the engine has reached the ignition permission rotation speed; and ii) the transmitted torque capacity allows the clutch to be kept in the half engaged state.

According to the invention, when the engine starts up, the engine rotation speed is increased by transmitting torque to the engine by the clutch in a state where the clutch is set to the half engaged state with a slip. When the engine rotation speed reaches the ignition permission rotation speed, combustion of fuel is started, for example, by igniting fuel supplied to the engine. Substantially simultaneously with combustion of fuel, the transmitted torque capacity of the clutch is increased while the clutch is kept in the half engaged state with a slip. Thus, even when combustion of fuel at the engine begins and the engine torque fluctuates, driving torque of the vehicle does not significantly fluctuate owing to a slip of the clutch, so shock, vibrations, and the like, are prevented or suppressed. In such a state where engine torque is unstable as well, torque is transmitted from the clutch in the half engaged state with a slip to the engine, and the engine rotation speed is increased, so a time shortens until the engine rotation speed or the engine torque becomes stable. The fact that the engine rotation speed or the engine torque becomes stable means substantial completion of start-up. That is, the control response of engine start-up while the vehicle is traveling improves.

When the engine rotation speed has not sufficiently increased yet and the engine rotation speed still falls within the resonant region, the transmitted torque capacity of the clutch is set so as to be larger than that in the case where the engine rotation speed exceeds the resonant region. Therefore, when the engine rotation speed falls within the resonant region, the rate of increase in the engine rotation speed increases, so it is possible to shorten a time during which resonance is occurring. As a result, it is possible to prevent or suppress vibrations and noise of the vehicle and a feeling of strangeness based on the vibrations and the noise. When vibration suppression control is executed in parallel, it is possible to reduce or suppress a control amount of the vibration suppression control.

Changes, such as an increase, a reduction, and the like, in the transmitted torque capacity of the clutch become a factor of fluctuating driving torque. According to the invention, the motor is controlled on the basis of the change of the transmitted torque capacity of the clutch, and fluctuations in driving torque are suppressed, so it is possible to prevent or suppress a feeling of strangeness, with the result that it is possible to improve drivability.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The invention provides a control system for a vehicle including an engine and a clutch. The engine starts up by cranking. The clutch transmits torque for the cranking to the engine via the clutch. The clutch is able to change its transmitted torque capacity. A motor for the cranking may be a so-called starter motor or may be a motor (or a motor generator; hereinafter, these are collectively referred to as motor) that generates driving force for propelling the vehicle. The vehicle including the motor as a driving force source in addition to the engine is called hybrid vehicle. This kind of vehicle is able to not only travel by using the engine or travel by using both the engine and the motor but also, for example, travel by using only the motor or travel while carrying out energy regeneration with the motor. The hybrid vehicle is able to be set to a drive mode in which, for example, the engine is stopped while the vehicle is traveling by using the motor and then the engine is restarted. In a so-called EV travel mode in which the vehicle travels by using the motor as the driving force source, it is desirable to suppress power losses due to co-rotation of the engine. In the case of an EV travel mode in which the vehicle includes a plurality of the motors and travels by using one of the motors, it is desirable to reduce power losses due to co-rotation of not only the engine but also the motor that is not outputting power. In response to such requests, the vehicle may include a clutch that disconnects the engine from a power transmission line that transmits power to a drive wheel. The invention is applied to a control system for a hybrid vehicle including this kind of clutch.

Figures 8, 9:
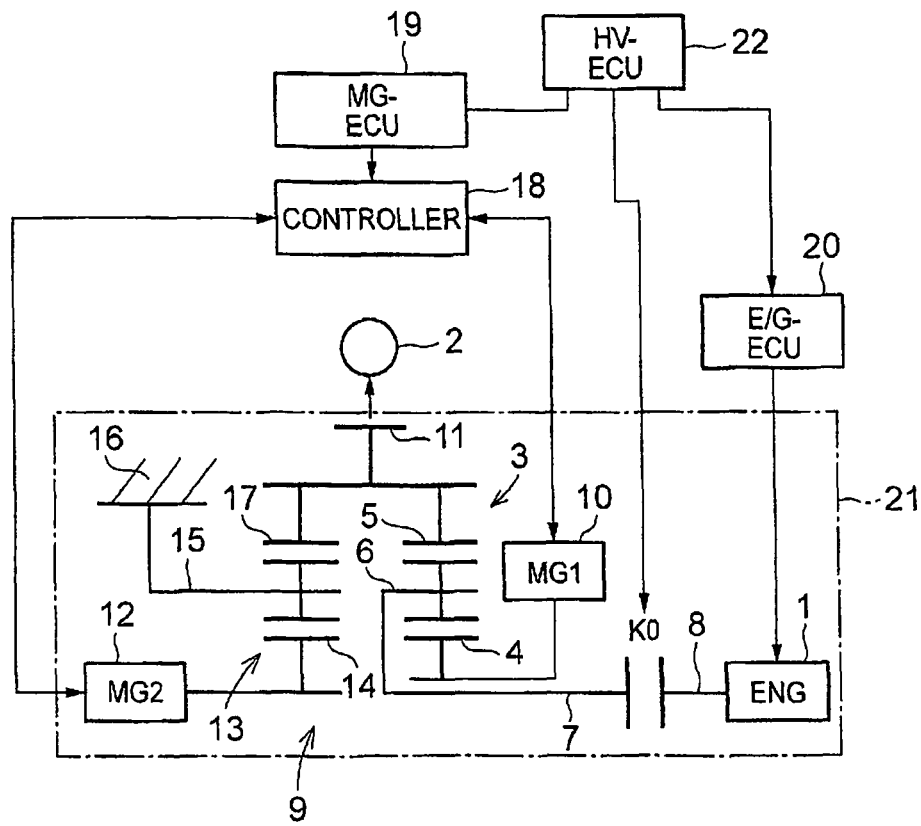
FIG. 8 is a skeletal view that shows an example of a powertrain of a hybrid vehicle to which the invention is applicable.
FIG. 9 is a table that collectively shows travel modes and engaged/released states of the clutch.

FIG. 8 schematically shows an example of a gear train in a hybrid vehicle including the above-described clutch. In this example, part of power output from an engine (ENG) 1 is transmitted to a drive wheel by mechanical means, while the other part of power output from the engine 1 is once converted to electric power, the electric power is reversely converted to mechanical power and then the mechanical power is transmitted to the drive wheel 2. A power split mechanism 3 is provided for splitting the power output from the engine 1 in this way. The power split mechanism 3 is one example of a transmission mechanism according to the invention, and is configured similarly to a power split mechanism in a generally known two-motor hybrid drive system. In the example shown in FIG. 8, the power split mechanism 3 is formed of a differential mechanism including three rotating elements for allowing differential motion, and is, for example, formed of a single-pinion planetary gear train.

The single-pinion planetary gear train includes a sun gear 4, a ring gear 5 and a carrier 6. The ring gear 5 is arranged concentrically with the sun gear 4. The carrier 6 supports pinion gears such that the pinion gears are rotatable on their axes and revolvable. Each of the pinion gears is in mesh with these sun gear 4 and ring gear 5.

The carrier 6 serves as an input element. An input shaft 7 is coupled to the carrier 6. A clutch K0 is provided between the input shaft 7 and an output shaft (crankshaft) 8 of the engine 1. The clutch K0 is used to couple the engine 1 to a power transmission line 9 or disconnects the engine 1 from the power transmission line 9. The power transmission line 9 includes the power split mechanism 3, and the like. The clutch K0 is formed of a friction clutch that continuously changes its transmitted torque capacity from a "zero" state, that is, a completely released state, to a completely engaged state where there is no slip. The friction clutch may be any one of a generally known dry type and a generally known wet type or may be any one of a single-disc type and a multi-disc type. An actuator that switches between the engaged state and the released state may be a hydraulic actuator, an electromagnetic actuator, or the like. For example, in the case of a dry-type single-disc clutch that is employed in an existing vehicle, the clutch is kept in the engaged state by a so-called return mechanism, such as a diaphragm spring, by setting the actuator to a non-actuated state. Thus, the transmitted torque capacity of the clutch K0 changes with an operation amount of the actuator for engaging or releasing the clutch K0, and correlates with the operation amount of the actuator. More specifically, a hydraulic pressure, current value or stroke of the actuator is substantially proportional to the transmitted torque capacity. Thus, the transmitted torque capacity may be defined in advance as a value with respect to an operation amount, such as stroke and hydraulic pressure, of the actuator, and may be prepared in form of map, or the like. When the friction coefficient changes with time, the correlation between the transmitted torque capacity and the above-described operation amount changes.

The sun gear 4 serves as a reaction element. A first motor (MG1) 10 is coupled to the sun gear 4. The first motor 10 is a motor having a power generating function. The first motor 10 corresponds to a motor or a first motor according to the invention. The first motor 10 is formed of a permanent magnet synchronous motor, or the like. The ring gear 5 serves as an output element. An output gear 11 that is an output member is integrated with the ring gear 5. The ring gear 5 is configured to output driving force from the output gear 11 to the drive wheel 2. A mechanism for transmitting driving force from the output gear 11 to the drive wheel 2 includes a differential gear and a drive shaft, and is similar to that of an existing vehicle, so the detailed description of the mechanism is omitted.

The engine 1, the power split mechanism 3 and the first motor 10 are arranged along the same axis. A second motor 12 is arranged along the extended line of the axis. The second motor 12 is used to generate driving force for propelling the vehicle or regenerate energy. The second motor 12 corresponds to a motor or a second motor according to the invention. The second motor 12 is formed of a permanent magnet synchronous motor, or the like, as well as the first motor 10. The second motor 12 is coupled to the output gear 11 via a speed reduction mechanism 13. The speed reduction mechanism 13 is formed of a single-pinion planetary gear train in the example shown in FIG. 8, and includes a sun gear 14, a carrier 15 and a ring gear 17. The second motor 12 is coupled to the sun gear 14. The carrier 15 is fixedly coupled to a fixed portion 16, such as a housing. The ring gear 17 is integrated with the output gear 11.

The motors 10, 12 are electrically connected to a controller 18. The controller 18 includes an electrical storage device, an inverter, and the like. A motor electronic control unit (MG-ECU) 19 that controls the controller 18 is provided. The electronic control unit 19 is mainly formed of a microcomputer. The electronic control unit 19 is configured to perform a computation on the basis of input data, stored data or a command signal, and output the result of the computation to the controller 18 as a control command signal. Each of the motors 10, 12 is configured to function as a motor or a generator in response to a control signal from the controller 18. Each of the motors 10, 12 is configured so that torque of each of the motors 10, 12, functioning as one of a motor and a generator, is controlled.

The engine 1 is configured so that the output and start-up/stop of the engine 1 are electrically controlled. In the case of, for example, a gasoline engine, a throttle opening degree, an amount of fuel supplied, stop of supply of fuel, execution and stop of ignition, an ignition timing, and the like, are configured to be electrically controlled. An engine electronic control unit (E/G-ECU) 20 for such controls is provided. The electronic control unit 20 is mainly formed of a microcomputer. The electronic control unit 20 is configured to perform a computation on the basis of input data or a command signal, output the result of the computation to the engine 1 as a control signal, and execute the above-described various controls.

The engine 1, the motors 10, 12, the clutch K0, the power split mechanism 3, and the like, constitute a driving force source 21. A hybrid electronic control unit (HV-ECU) 22 that controls the driving force source 21 is provided. The electronic control unit 22 is mainly formed of a microcomputer. The electronic control unit 22 is configured to execute various controls described below by outputting command signals to the motor electronic control unit 19 and the engine electronic control unit 20.

The hybrid drive system shown in FIG. 8 is, allowed to be set to a hybrid (HV) mode and an electric vehicle (EV) mode. In the HV mode, the vehicle travels by using the power of the engine 1. In the EV mode, the vehicle travels by using electric power. The EV mode includes a disconnect EV mode and an ordinary EV mode. In the disconnect EV mode, the engine 1 is disconnected from the power transmission line 9. In the ordinary EV mode, the engine 1 is coupled to the power transmission line 9, FIG. 9 collectively shows engaged and released states of the clutch K0 in setting these modes. In the disconnect EV mode, the clutch K0 is released. In contrast, in the ordinary EV mode or the HV mode, the clutch K0 is engaged. One of these travel modes is selected on the basis of a travelling state of the vehicle. The traveling state of the vehicle includes a required driving amount, such as an accelerator operation amount, a vehicle speed, a state of charge (SOC) of the electrical storage device, and the like. For example, when the vehicle travels at a speed higher than a certain level and the accelerator operation amount is increased to some extent in order to keep the vehicle speed, the HV mode is set. In contrast, when the SOC is sufficiently high and the accelerator operation amount is relatively small or when the vehicle is in a traveling state where it is highly likely to restart the automatically stopped engine 1, the ordinary EV mode is set. For example, when the EV mode is manually selected by a driver or when the vehicle is allowed to travel by using only electric power and it is required to suppress power losses due to co-rotation of the first motor 10, the disconnect EV mode is selected.

Figure 10:
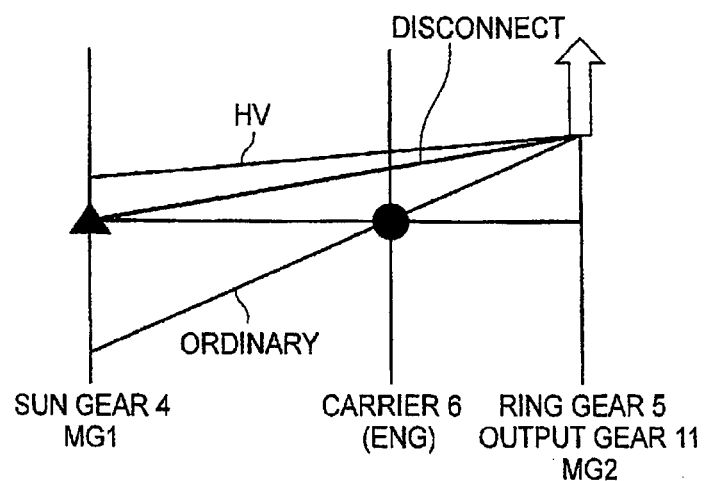
FIG. 10 is a nomograph for illustrating an operation state of each travel mode.

The operation state of the hybrid drive system in each travel mode will be simply described. FIG. 10 is a nomograph for the power split mechanism 3. In this nomograph, the vertical lines indicate the sun gear 4, the carrier 6 and the ring gear 5, the intervals between those sun gear 4, carrier 6 and ring gear 5 correspond to the gear ratio of the planetary gear train that constitutes the power split mechanism 3, the vertical direction of each vertical line represents rotation direction, and a position in the vertical direction represents rotation speed. The line indicated by "disconnect" in FIG. 10 indicates the operation state in the disconnect EV mode. In this travel mode, the second motor 12 is caused to function as a motor and the vehicle travels by using the power of the second motor 12, the engine 1 is disconnected from the power transmission line 9 and is stopped by releasing the clutch K0, and the first motor 10 is also stopped. Thus, rotation of the sun gear 4 is stopped, while the ring gear 5 rotates in the forward direction together with the output gear 11, and the carrier 6 rotates in the forward direction at a rotation speed reduced from the rotation speed of the ring gear 5 on the basis of the gear ratio of the planetary gear train.

The line indicated by "ordinary" in FIG. 10 indicates the operation state in the ordinary EV mode. In this travel mode, the vehicle travels by using the power of the second motor 12 and the engine 1 is stopped, so the ring gear 5 rotates in the forward direction and the sun gear 4 rotates in the reverse direction in a state where the carrier 6 is fixed. In this case, the first motor 10 is allowed to function as a generator. The line indicated by "HV" in FIG. 10 indicates the operation state in the HV mode. In this travel mode, the engine 1 outputs driving force in a state where the clutch K0 is engaged, so torque acts on the carrier 6 in a direction to rotate the carrier 6 in the forward direction. In this state, when the first motor 10 is caused to function as a generator, torque acts on the sun gear 4 in the reverse direction. As a result, torque appears in the ring gear 5 in a direction to rotate the ring gear 5 in the forward direction. In this case, electric power generated by the first motor 10 is supplied to the second motor 12, the second motor 12 functions as a motor, and the driving force of the second motor 12 is transmitted to the output gear 11. Thus, in the HV mode, part of power output from the engine 1 is transmitted to the output gear 11 via the power split mechanism 3, while the remaining power is converted to electric power by the first motor 10, the electric power is transmitted to the second motor 12 and is reversely converted to mechanical power by the second motor 12, and the mechanical power is transmitted to the output gear 11. In any of the travel modes, when it is not required to actively output driving force, such as during deceleration, one of the motors 10, 12 is caused to function as a generator, and regenerate energy.

The intended vehicle in the invention is able to travel while stopping operation of the engine 1 as in the case of the above-described hybrid vehicle. In this case, the vehicle disconnects the engine 1 from the power transmission line 9 by controlling the clutch K0 to the released state in order to reduce or avoid power losses due to co-rotation of the engine 1. When driving force becomes insufficient for a required driving force or the SOC of the electrical storage device becomes low in a state where the vehicle is traveling in this so-called disconnect EV mode, the engine 1 is restarted. Cranking of the engine 1 for the restart is allowed to be carried out by the motor that outputs driving force for propelling the vehicle. In this case, the released clutch K0 is engaged. The control system according to the invention executes control for engaging the clutch K0 as will be described below in order to crank the engine 1 while the vehicle is traveling.

Figure 1:
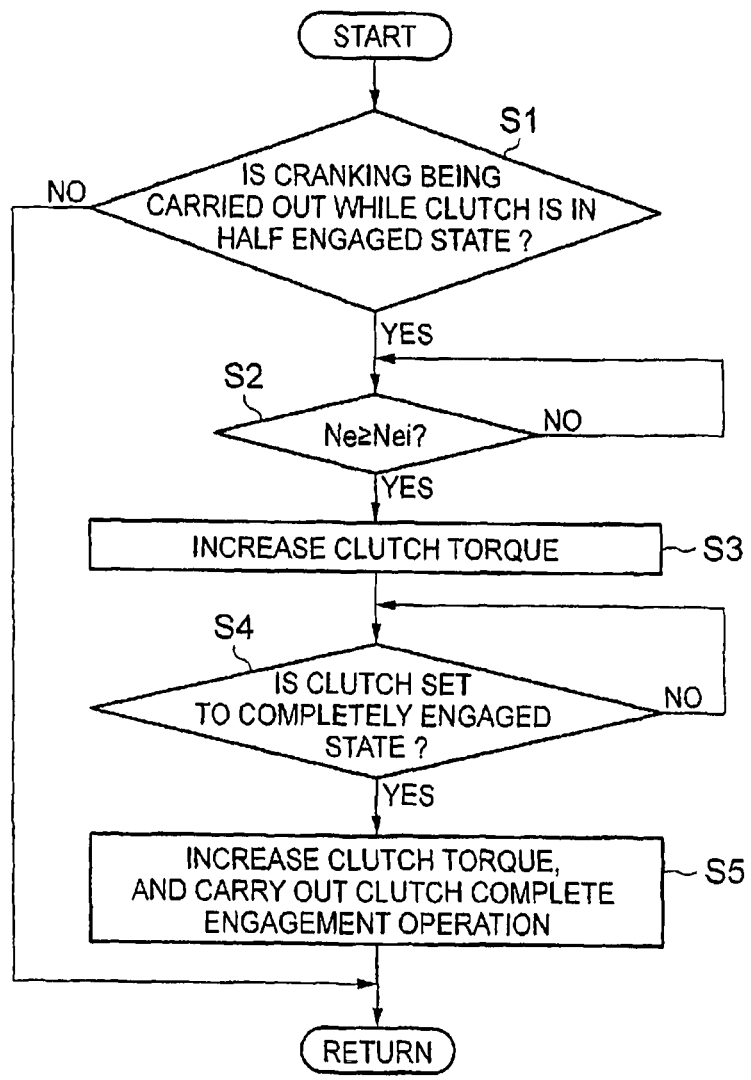
FIG. 1 is a flowchart for illustrating an example of control that is executed in a control system and a control method according to the invention.

FIG. 1 is a flowchart for illustrating an example of the control. This routine is executed at the time when the engine 1 is cranked in order to start up the engines 1 while the vehicle is traveling. A hybrid vehicle including the above-described powertrain shown in FIG. 8 is traveling by driving the second motor 12. Cranking of the engine 1 for restart is carried out as follows. The clutch K0 is set to a half engaged state with a slip, and cranking torque is transmitted to the engine 1 via the clutch K0. In this case, the first motor 10 is caused to function as a generator to apply reaction to the sun gear 4 in order to transmit torque to the engine 1.

Thus, initially, it is determined whether cranking of the engine (ENG) 1 is being carried out in a state where the clutch K0 is in the half engaged state (step S1). This determination is carried out on the basis of the fact that a condition for restarting the engine 1 is satisfied, the fact that a command to carry out cranking for restart of the engine 1 is issued, the fact that a command signal for setting the clutch K0 to the half engaged state is output as a result of fulfillment of these conditions, or the like.

When negative determination is made in step S1, it is not in a state of restarting the engine 1, so the routine returns without executing any control. On the contrary, when affirmative determination is made in step S1, it is determined whether an engine rotation speed Ne is higher than or equal to an ignition permission rotation speed Nei (step S2). The transmitted torque capacity of the clutch K0 and the torque that is transmitted to the engine 1 via the clutch K0 are sufficient to increase the rotation speed of the engine 1 at a predetermined rate of increase, and there is a slip of the clutch K0. Thus, the rotation speed Ne of the engine 1 gradually increases with a lapse of time. In step S2, it is determined whether the engine rotation speed Ne is higher than or equal to the ignition permission rotation speed Nei. The ignition permission rotation speed Nei is a rotation speed at or above which the engine 1 is allowed to continue autonomous rotation by supplying fuel to the engine 1 or energizing an ignition plug (not shown) in addition to supply of fuel. The ignition permission rotation speed Nei may be determined in advance by an experiment, or the like, on the basis of the displacement and type of the engine 1, a state of warm-up (the temperature of the engine 1), or the like.

When negative determination is made in step S2 because the engine rotation speed Ne is lower than the ignition permission rotation speed Nei, for example, the routine returns to step S1, and continues the previous control state. In contrast, when affirmative determination is made in step S2 because the engine rotation speed Ne is higher than or equal to the ignition permission rotation speed Nei, the transmitted torque capacity (clutch torque) of the clutch K0 is increased (step S3). When the clutch K0 is a dry clutch described with reference to FIG. 8, an operating force (pressing force) of the actuator (for example, hydraulic cylinder) that operates to release the clutch K0 is reduced. The thus set transmitted torque capacity of the clutch K0 is larger than the capacity before being increased in step S3, and is a capacity corresponding to the half engaged state where the clutch K0 transmits torque with a slip. Control for setting the transmitted torque capacity may be executed by feedback control so that the actuator for the clutch K0 is controlled on the basis of a slip rotation speed of the clutch K0 or may be executed by controlling the actuator for the clutch K0 at a control command value determined in advance by an experiment, simulation, or the like.

When the engine rotation speed Ne reaches the ignition permission rotation speed Nei, supply of fuel to the engine 1 is resumed, and, in the case of a gasoline engine, an ignition plug is energized to ignite air-fuel mixture. As a result, combustion of fuel begins in the engine 1, and the engine 1 starts autonomous rotation accordingly. However, the rotation speed and output torque of the engine 1 are unstable just after the beginning of combustion of fuel in the engine 1, and vary significantly. However, the clutch K0 is in the half engaged state with a slip, so, when the torque of the engine 1 fluctuates, a slip of the clutch K0 increases accordingly. Therefore, fluctuations in the torque of the engine 1 are reduced or attenuated by the clutch K0, with the result that large fluctuations in the torque of the drive wheel 2 or associated deterioration of shock is prevented or suppressed.

When the transmitted torque capacity of the clutch K0 is increased as described above with a slip of the clutch K0, the rotation speed Ne of the engine 1 that is unstable yet has started autonomous rotation is further increased by the torque that is transmitted via the clutch K0. The rate of increase (the gradient of increase) in the engine notation speed Ne in this case becomes higher than that before the transmitted torque capacity of the clutch K0 is increased. When the engine rotation speed Ne has increased in this way, the engine rotation speed Ne is finally equal to the rotation speed Ni of the input shaft 7 that is the output-side rotation speed of the clutch K0. In step S4, it is determined whether the engine rotation speed Ne coincides with the rotation speed of the input shaft 7, that is, the clutch K0 does not slip anymore and the clutch K0 is set to the completely engaged state. When negative determination is made in step S4 because the clutch K0 is not set to the completely engaged state, the routine returns to step S3, and the previous control state is continued. In contrast, when affirmative determination is made in step S4 because the clutch K0 is set to the completely engaged state, the transmitted torque capacity is further increased so that the clutch K0 does not slip (step S5). That is, an operation to completely engage the clutch K0 is executed.

In this way, in the control system according to the invention, when the clutch K0 is engaged in order to restart the engine 1 that is stopped while the vehicle is traveling, after the engine rotation speed becomes the ignition permission rotation speed, the transmitted torque capacity of the clutch K0 in the half engaged state with a slip is increased while allowing the clutch K0 to slip. Therefore, the rotation speed of the engine 1 in a state where combustion of fuel, rotation speed or torque is unstable is quickly increased while suppressing torque fluctuations by a slip. As a result, the engine 1 quickly shifts from an unstable state to a stable operating state. According to the invention, eventually, a time from the beginning of start-up of the engine 1 to substantially completion of start-up shortens, so the response of start-up control over the engine 1 improves and, by extension, drivability improves.

Figure 2:
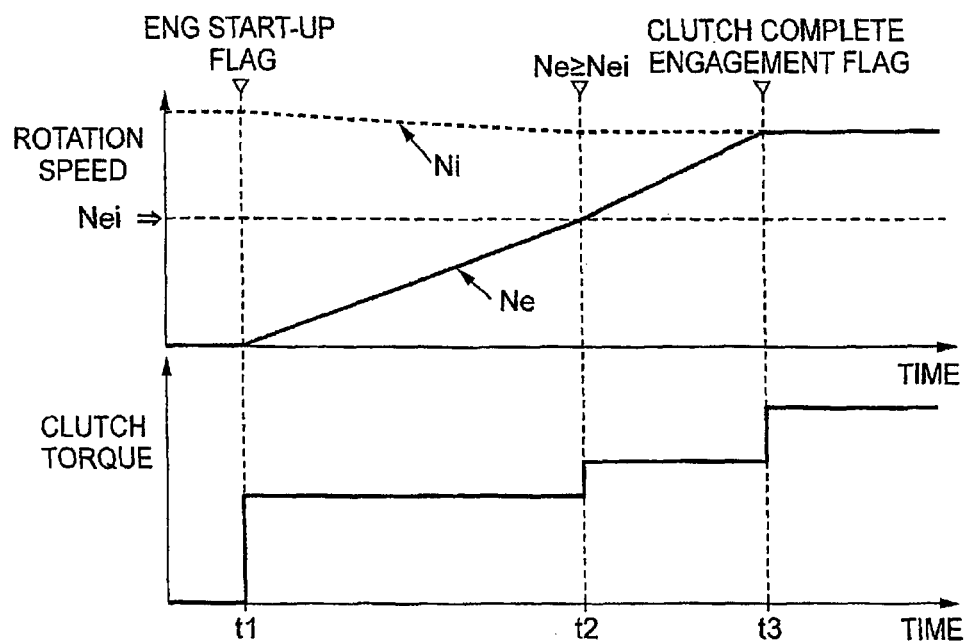
FIG. 2 is a time chart that schematically shows changes in engine rotation speed, input shaft rotation speed and transmitted torque capacity command value (clutch torque) of a clutch in the case where control shown in FIG. 1 is executed.

FIG. 2 schematically shows changes in the engine rotation speed Ne, the rotation speed Ni of the input shaft 7 and the transmitted torque capacity (clutch torque) command value of the clutch K0 in the case where the control shown in FIG. 1 is executed. The vehicle is traveling by using the second motor 12 while stopping the operation of the engine 1, the clutch K0 is released and, as a result, the transmitted torque capacity of the clutch K0 is "zero", and the rotation speed Ni of the input shaft 7 is a rotation speed based on a vehicle speed because the vehicle is traveling. In this state, when the condition for restarting the engine 1 is satisfied and a flag is set to "ON" (t1 timing), the clutch torque is increased. The command value of the clutch torque at this timing is such a command value that it is possible to increase the engine rotation speed Ne and the clutch K0 slips, and is a predetermined value.

Thus, the engine rotation speed Ne gradually increases, and the engine rotation speed Ne reaches the ignition permission rotation speed Nei at t2 timing at which a predetermined time has elapsed. Accordingly, the clutch torque is increased. The clutch torque in this case is a torque sufficient to set the clutch K0 to the half engaged state with a slip and further increase the engine rotation speed Ne.

When the engine rotation speed Ne has reached the ignition permission rotation speed Nei, fuel is supplied to the engine 1, and combustion of air-fuel mixture begins. Accordingly, the engine 1 starts autonomous rotation. In addition to this, the engine rotation speed Ne is increased by the torque based on the increased clutch torque, so the engine rotation speed Ne starts to increase at a gradient larger than that before. Therefore, the engine rotation speed Ne approaches the rotation speed Ni of the input shaft 7 in a short time, and finally the rotation speeds Ne, Ni coincide with each other (t3 timing). That is the clutch K0 does not slip anymore, and the clutch K0 shifts into the completely engaged state. Thus, at this timing, torque is increased to the torque that allows the clutch K0 to be kept in the completely engaged state.

In the example shown in FIG. 1, the transmitted torque capacity (clutch torque) of the clutch K0 is kept constant until the engine rotation speed Ne reaches the ignition permission rotation speed Nei. Instead, in the invention, the transmitted torque capacity (clutch torque) of the clutch K0 may be configured to change on the basis of fulfillment of a predetermined condition in process until the engine rotation speed Ne reaches the ignition permission rotation speed Nei.

Figure 3:
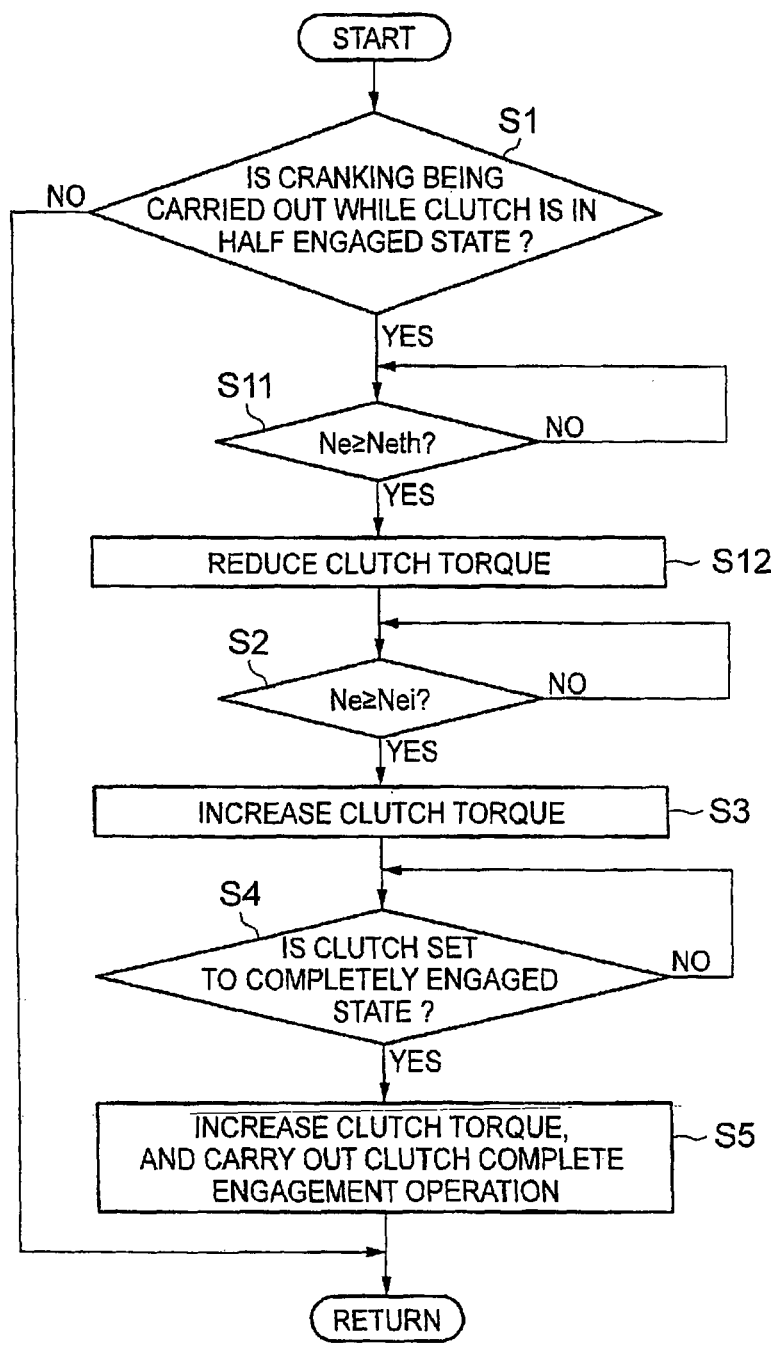
FIG. 3 is a flowchart for illustrating another example of control that is executed in the control system and the control method according to the invention.

An example of this control is shown by the flowchart in FIG. 3. In this example, the rate of increase (the gradient of increase) in the engine rotation speed Ne is varied between the case where the engine rotation speed Ne falls within a resonant region and the case where the engine rotation speed Ne exceeds the resonant region.

In the example shown in FIG. 3 as well, initially, it is determined whether cranking of the engine (ENG) 1 is being carried out in a state where the clutch K0 is in the half engaged state (step S1). When negative determination is made in step S1, the routine returns without executing any control. On the contrary, when affirmative determination is made in step S1, it is determined whether the engine rotation speed Ne is higher than or equal to a predetermined rotation speed threshold Neth (step S11). The rotation speed threshold Neth is an upper limit rotation speed that defines the resonant region of the vehicle or a rotation speed higher than the upper limit rotation speed. The powertrain, vehicle body, and the like, of the vehicle constitute a vibration system, and have a predetermined resonant frequency basil on the mass, moment of inertia, modulus of elasticity, and the like. When the rotation speed of the engine 1 or the rotation speed of the power transmission line 9 coincides with a rotation speed corresponding to the resonant frequency of the vehicle, excessive vibrations occur. The resonant rotation speed of the intended vehicle in this invention is set to a rotation speed lower than the rotation speed at which the engine 1 autonomously rotates. Thus, in process of increasing the rotation speed Ne of the engine 1 by cranking, the engine rotation speed Ne enters a predetermined rotation speed region including the above-described resonant rotation speed. The resonant region may be set as a region including the above-described resonant rotation speed in design. The rotation speed threshold Neth that is the criterion of determination in step S11 is an upper limit-side rotation speed of the resonant region set in advance in this way or a rotation speed slightly higher than the upper limit-side rotation speed. Thus, step S11 determines whether the engine rotation speed Ne exceeds the resonant region.

When negative determination is made in step S11, for example, the routine returns to step S1 in order to keep the previous control state. In contrast, when affirmative determination is made in step S11, the transmitted torque capacity (clutch torque) of the clutch K0 is reduced (step S12). The reduced clutch torque is set to the transmitted torque capacity that allows the clutch K0 to be kept in the half engaged state where the clutch K0 transmits torque with a slip and it is possible to increase the engine rotation speed Ne, and is set to the transmitted torque capacity smaller than that before affirmative determination is made in step S11, that is, the transmitted torque capacity in the case where the engine rotation speed is lower than the rotation speed threshold Neth.

The clutch torque reduced in step S12 is able to absorb or attenuate pulsations or fluctuations in torque or changes in rotation speed after initial combustion of the engine 1 by using a slip of the clutch K0. Thus, before the engine rotation speed Ne reaches the rotation speed threshold Neth, that is, when the engine rotation speed Ne is lower than Neth, the transmitted torque capacity of the clutch K0 is allowed to be set so as to be larger than the transmitted torque capacity (clutch torque) at initial combustion of the engine 1. Therefore, when the control shown in FIG. 3 is executed, it is possible to increase clutch torque at the initial stage of cranking of the engine 1 as compared to that in the case of the control shown in FIG. 1. Therefore, by controlling as shown in FIG. 3, it is possible to quickly increase the engine rotation speed Ne. As a result, a time during which the engine rotation speed Ne falls within the resonant region shortens, so it is possible to reduce vibrations and noise and, by extension, it is possible to improve ride comfort.

After the clutch torque is reduced in step S12, the routine proceeds to step S2 to step S5 in sequence. The details of control of these step S2 to step S5 are similar to those of the above-described example of the control shown in FIG. 1. Thus, like step numbers in FIG. 3 denote similar steps in FIG. 1, and the description thereof is omitted.

Figure 4:
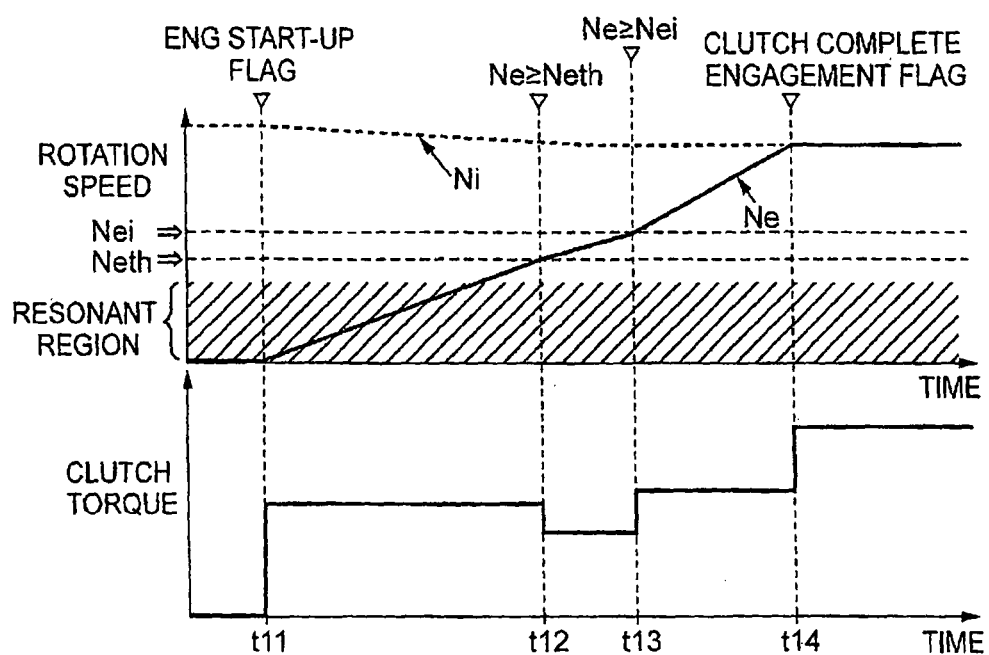
FIG. 4 is a time chart that schematically shows changes in engine rotation speed, input shaft rotation speed and transmitted torque capacity (clutch torque) command value of the clutch in the case in the case where control shown in FIG. 3 is executed.

FIG. 4 is a time chart that schematically shows changes in the engine rotation speed Ne, the rotation speed Ni of the input shaft 7 and the transmitted torque capacity (clutch torque) command value of the clutch K0 in the case where the control shown in FIG. 3 is executed. The vehicle travels by using the second motor 12 while stopping the operation of the engine 1. The clutch K0 is released and, as a result, the transmitted torque capacity of the clutch K0 is "zero". The rotation speed Ni of the input shaft 7 is a rotation speed based on a vehicle speed because the vehicle is traveling. In this state, when the condition for restarting the engine 1 is satisfied and the flag is set to "ON" (t11 timing), the clutch torque is increased. The command value of the clutch torque at this timing is such a command value that it is possible to increase the engine rotation speed Ne and the clutch K0 slips, and is a predetermined value. In the example of the control shown in FIG. 3, as described above, it is possible to increase the clutch torque until the engine rotation speed Ne reaches the predetermined rotation speed threshold Neth, that is, while the engine rotation speed Ne is lower than Neth. Therefore, the command value of the clutch torque at t11 timing is larger than the command value at t1 timing in the example shown in FIG. 1 or FIG. 2.

The engine rotation speed Ne gradually increases with an increase in the clutch torque; however, the engine rotation speed Ne falls within the resonant region at the initial stage. After that, the engine rotation speed Ne falls outside the resonant region, and increases to the rotation speed threshold Neth (t12 timing). Control for reducing the clutch torque is executed. The clutch torque that is set by this reducing control, as in the case of the above-described example shown in FIG. 1 or FIG. 2, is the clutch torque by which it is possible to increase the engine rotation speed Ne and the clutch K0 is engaged in the half engaged state with a slip. Thus, the gradient of increase (the rate of increase) in the engine rotation speed Ne slightly reduces as compared to the case before then however, the engine rotation speed Ne continues to increase.

After that, the engine rotation speed Ne reaches the ignition permission rotation speed Nei (t13 timing). Because the engine rotation speed Ne has reached the ignition permission rotation speed Nei, fuel is supplied to the engine 1, and combustion of air-fuel mixture begins. Accordingly, the engine 1 starts autonomous rotation. In addition to this, the engine rotation speed Ne is increased by the torque based on the increased clutch torque, so the engine rotation speed Ne starts to increase at a gradient larger than that before. Therefore, the engine rotation speed Ne approaches the rotation speed Nei of the input shaft 7 in a short time, and finally the rotation speeds Ne, Nei coincide with each other (t14 timing). That is, the clutch K0 does not slip anymore, and the clutch K0 shifts into the completely engaged state. Thus, at this timing, torque is increased to the torque that allows the clutch K0 to be kept in the completely engaged state.

The above-described examples of the controls shown in FIG. 1 to FIG. 4 are the examples of control for starting up the engine 1 by cranking by using a torque including travel inertial force of the vehicle while the vehicle is traveling in the so-called EV travel mode. Such a method of starting up the engine 1 is a so-called "push starting". The engine 1 is coupled to the power transmission line 9, the engine 1 is cranked by utilizing the torque of the power transmission line 9. Therefore, part of the torque transmitted to the drive wheel 2 is used to crank the engine 1, so the clutch torque corresponding to the torque for cranking the engine 1 becomes a factor of fluctuating the torque at the drive wheel 2. In order to suppress fluctuations in driving force, acceleration or deceleration as a result of start-up of the engine 1, the control system according to the invention may be configured to execute the following control.

Figure 5:
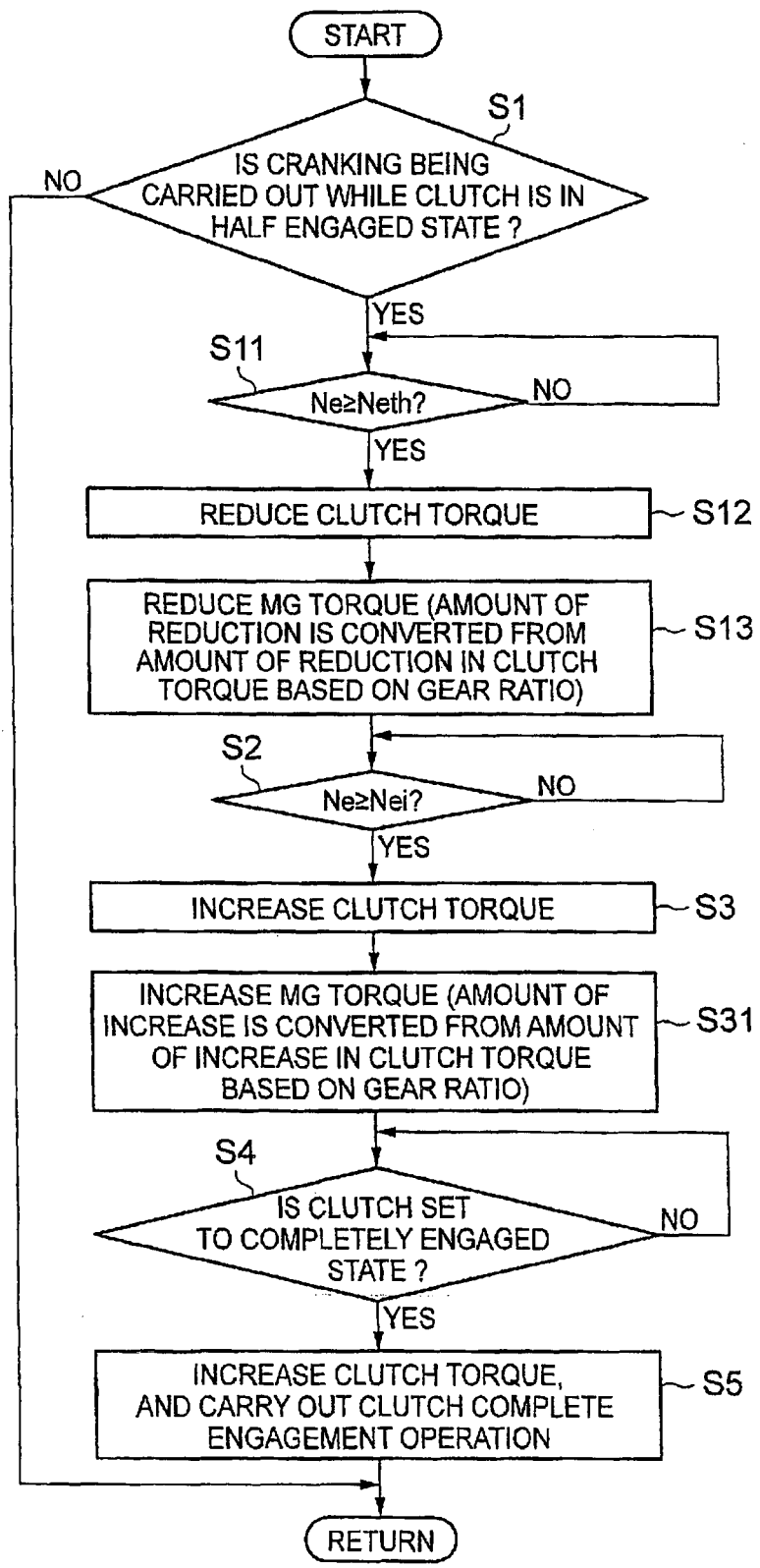
FIG. 5 is a flowchart for illustrating further another example of control that is executed in the control system and the control method according to the invention.

FIG. 5 is a flowchart for illustrating an example of the control, and includes a step of controlling driving torque in addition to the above-described example of the control shown in FIG. 3. Thus, in FIG. 5, like step numbers denote similar control steps to the control steps shown in FIG. 3, and the description thereof is omitted. Because fluctuations in clutch torque become a factor of fluctuations in driving torque, in the example of the control shown in FIG. 5, when the clutch torque is reduced in step S12, the torque (MG torque) of the motor is reduced (step S13), and, after that, the routine returns to step S2.

The motor is coupled to the power transmission line 9, and at least part of torque output from the motor is used as driving torque for propelling the vehicle at the drive wheel 2. In the above-described vehicle including the powertrain shown in FIG. 8, the motor is the second motor 12. The amount of reduction in the torque corresponds to the amount of increase in driving torque as a result of reduction in clutch torque. That is, the amount of reduction in the torque is an amount by which it is possible to suppress fluctuations in driving torque at the drive wheel 2. In this case, in the vehicle including the powertrain shown in FIG. 8, the influence of the clutch torque appears on the basis of the gear ratio (speed ratio) of the power split mechanism 3, so the torque of the second motor 12 is reduced in consideration of the gear ratio.

On the other hand, in the example of the control shown in FIG. 5, when the clutch torque is increased in step S3, the torque (MG torque) of the motor is increased (step S31), and, after that, the routine proceeds to step S4. In the vehicle including the powertrain shown in FIG. 8, the motor may be the second motor 12 of which the torque is reduced in step S13. The amount of increase in the torque is the amount of increase corresponding to the amount of reduction in driving torque as a result of an increase in the clutch torque. That is, the amount of increase in the torque is an amount by which it is possible to suppress fluctuations in driving torque at the drive wheel 2. In this case, in the vehicle including the powertrain shown in FIG. 8, the influence of the clutch torque appears on the basis of the gear ratio (speed ratio) of the power split mechanism 3, so the torque of the second motor 12 is increased in consideration of the gear ratio.

Figure 6:
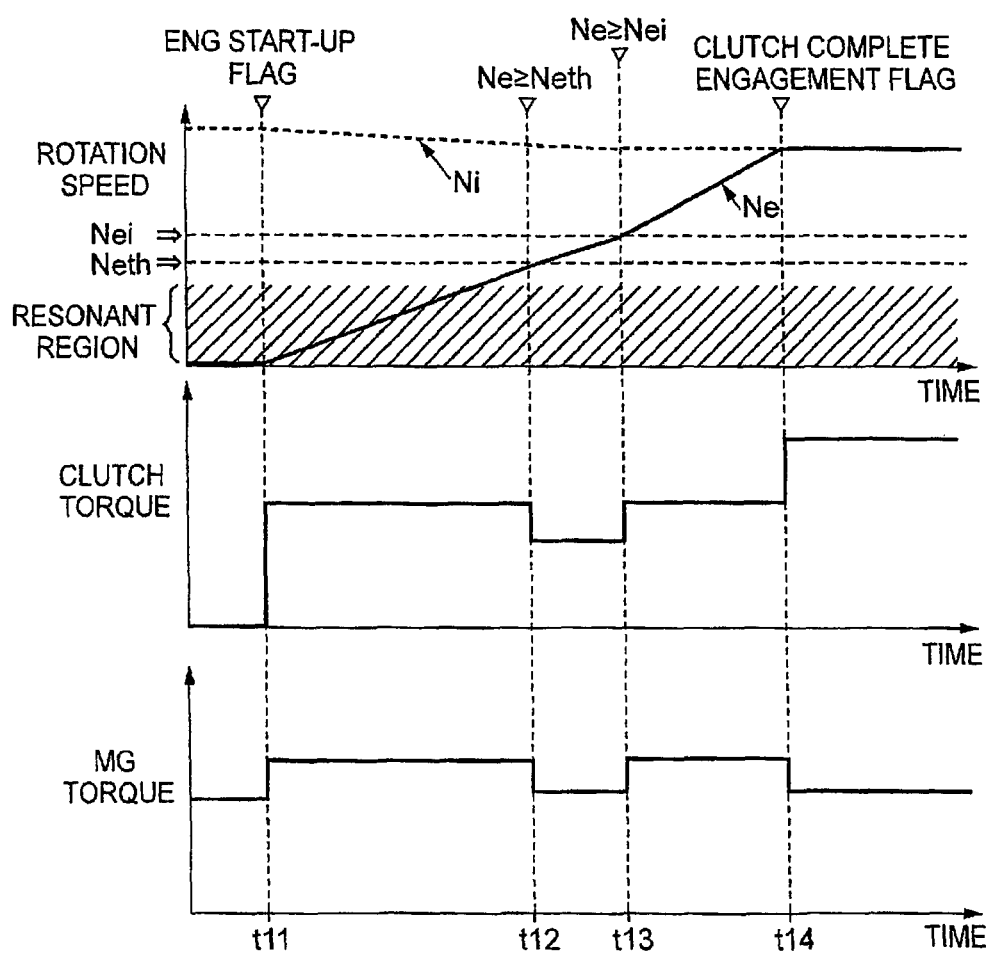
FIG. 6 is a time chart that schematically shows changes in engine rotation speed, input shaft rotation speed, transmitted torque capacity (clutch torque) command value of the clutch and MG torque in the case where control shown in FIG. 5 is executed.

FIG. 6 schematically shows changes in the engine rotation speed Ne, the rotation speed Ni of the input shaft 7, the transmitted torque capacity (clutch torque) command value of the clutch K0 and the motor (MG) torque in the case where the control shown in FIG. 5 is executed. As described above, the example of the control shown in FIG. 5 includes torque control over the motor in addition to the example of the control shown in FIG. 3. Thus, changes in the engine rotation speed Ne, the rotation speed Ni of the input shaft 7 and the transmitted torque capacity (clutch torque) command value of the clutch K0 in the time chart shown in FIG. 6 are the same as those in the above-described time chart shown in FIG. 4. FIG. 6 shows a change in the torque of the second motor 12 together. Until t11 timing at which a start-up flag of the engine 1 is set to the ON state, the MG torque is set to a torque for causing the vehicle to travel in the EV travel mode. In this state, when the start-up flag of the engine 1 is set to the ON state, the torque of the second motor 12 is increased to a torque added with the torque that is required to crank the engine 1.

The clutch torque is reduced at t12 timing, so the MG torque is reduced accordingly. The clutch torque is increased at t13 tinting at which the engine rotation speed Ne has reached the ignition permission rotation speed Nei, so the MG torque is increased together. FIG. 6 shows that the clutch torque is increased to the clutch torque for complete engagement at t14 timing and, at the same time the MG torque is reduced. The reduction in the MG torque is a reduction due to a shift of the travel mode of the vehicle into the hybrid mode.

Thus, when the torque of the first motor 10 or the second motor 12 is controlled as shown in FIG. 5 or FIG. 6, it is possible to prevent or suppress fluctuations in driving torque due to a change in clutch torque. As a result, it is possible to prevent or suppress unintentional deceleration or acceleration of the vehicle, so it is possible to improve drivability.

Figure 7:
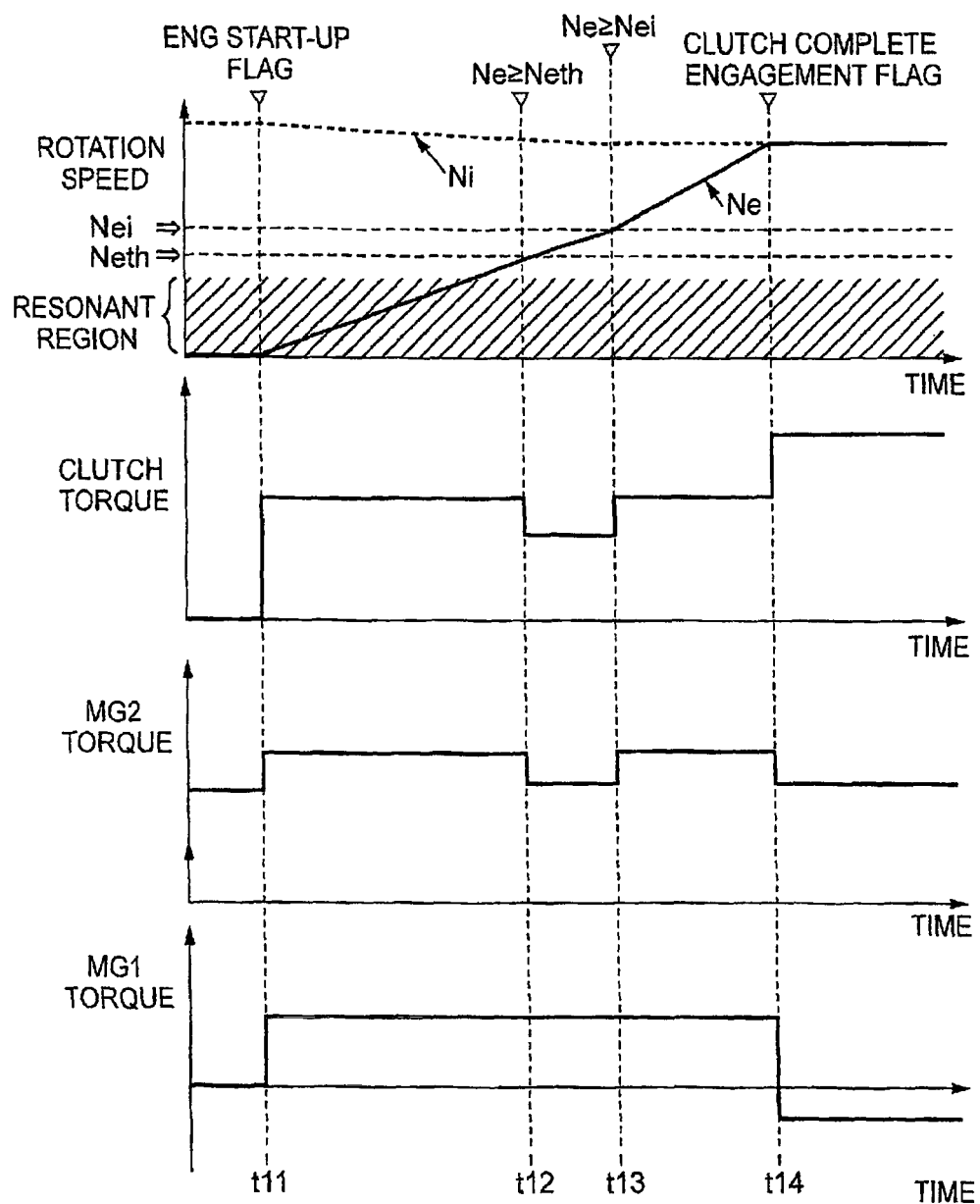
FIG. 7 is a time chart that shows an example in which driving torque is output by a second motor generator and the torque of the second motor generator is changed with a change in clutch torque.

In the vehicle including the above-described powertrain shown in FIG. 8, it is possible to output driving torque in traveling in the EV mode by the second motor (MG2) 12, and crank the engine 1 by the first motor 10. Thus, in response to an increase or decrease in the transmitted torque capacity of the clutch K0 as described above in order to crank the engine 1, the torque of the second motor 12 is controlled in order to stabilize driving torque at the drive wheel 2. FIG. 7 is a time chart that shows changes in the torque of the motor 10 and the torque of the motor 12 in the case where such control is executed. FIG. 7 shows the MG torque in the above-described time chart shown in FIG. 6 separately for the torque (MG1 torque) of the first motor (MG1) 10 and the torque (MG2 torque) of the second motor (MG2) 12. Thus, the items other than the items of these torques are the same as those in the time chart shown in FIG. 6.

In the so-called two-motor hybrid vehicle shown in FIG. 8, the first motor 10 is caused to function in order to crank the engine 1, so the output torque (MG1 torque) is kept at a set torque that is determined in advance as a torque that is required to crank the engine 1 in the period from t11 timing at which start-up control over the engine 1 is started to t14 timing at which start-up of the engine 1 completes and the complete engagement flag of the clutch K0 is set to the ON state. The output torque of the first motor 10 may be changed in response to an increase or decrease in the clutch torque, or the like. This is because it may be required to reduce the influence of a change in clutch torque, or the like, on driving torque, or the like.

After completion of start-up of the engine 1, the travel mode shifts into the HV mode, so the first motor 10 is used in order to control the engine rotation speed Ne, and is set to a torque based on the control. In contrast, driving torque for propelling the vehicle is output by the second motor 12, so the output torque (MG2 torque) is increased or reduced in response to a change in clutch torque. The mode of the change (control) is similar to the MG torque shown in FIG. 6. Until t11 timing at which the start-up flag of the engine 1 is set to the ON state, the torque of the second motor 12 is set to a torque for causing the vehicle to travel in the EV travel mode. In this case, when the start-up flag of the engine 1 is set to the ON state, the clutch torque is increased and the torque for cranking the engine 1 is added as a load, so the output torque of the second motor 12 is increased in order to keep driving torque at the drive wheel 2.

Because the clutch torque is reduced at t12 timing, the output torque of the second motor 12 is reduced accordingly. The clutch torque is increased at t13 timing at which the engine rotation speed Ne has reached the ignition permission rotation speed Nei, the output torque of the second motor 12 is increased together. FIG. 7 shows that the clutch torque is increased to the clutch torque for complete engagement at t14 timing and, at the same time, the output torque of the second motor 12 is reduced. The reduction in the output torque of the second motor 12 is a reduction due to a shift of the travel mode of the vehicle into the hybrid mode.

Thus, when the torque of the first motor 10 or the second motor 12 is controlled as shown in FIG. 5, FIG. 6, or FIG. 7, it is possible to prevent or suppress fluctuations in driving torque due to a change in clutch torque. As a result, it is possible to prevent or suppress unintentional deceleration or acceleration of the vehicle, so it is possible to improve drivability.

Figure 11:
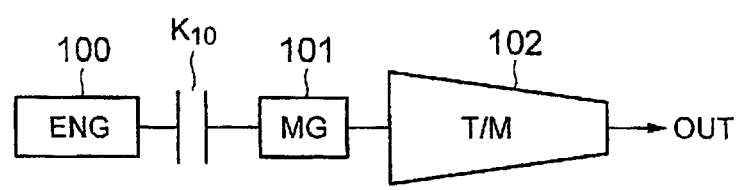
FIG. 11 is a block diagram that shows another example of a powertrain of a vehicle to which the invention is applicable.
Figure 12:
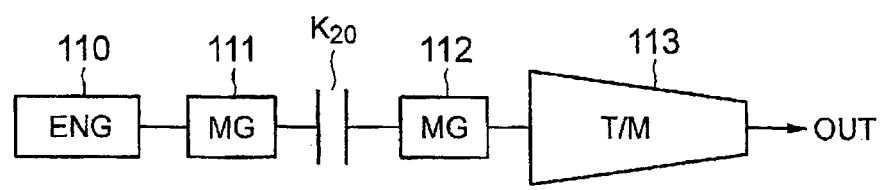
FIG. 12 is a block diagram that shows further another example of a powertrain of a vehicle to which the invention is applicable.

When the invention is applied to a control system for a vehicle including a motor that reduces fluctuations in driving torque due to fluctuations in clutch torque, the configuration of a powertrain of the vehicle is not limited to the above-described configuration shown in FIG. 8, and may be configured as follows. FIG. 11 shows one example of the configuration of the powertrain. In this example, a clutch K10 is arranged between an engine (ENG) 100 and a motor 101, and a transmission (T/M) 102 is coupled to an output side of the motor (MG) 101. In the example shown in FIG. 12, a first motor (MG) 111 is coupled to an output side of an engine (ENG) 110, a second motor (MG) 112 is coupled to the first motor 111 via a clutch K20, and a transmission (T/M) 113 is coupled to an output side of the second motor 112. A vehicle including any one of these powertrains is also able to travel while stopping the operation of the engine 100 or engine 110 and releasing the clutch K10 or clutch K20, and is also able to start up the engine 100 or engine 110 by controlling the clutch K10 or clutch K20 as described above during travelling in a so-called EV travel mode. It is possible to suppress unintentional fluctuations in driving torque by controlling the MG torque as described above together with control over the clutch K10 or the clutch K20.

Figure 13:
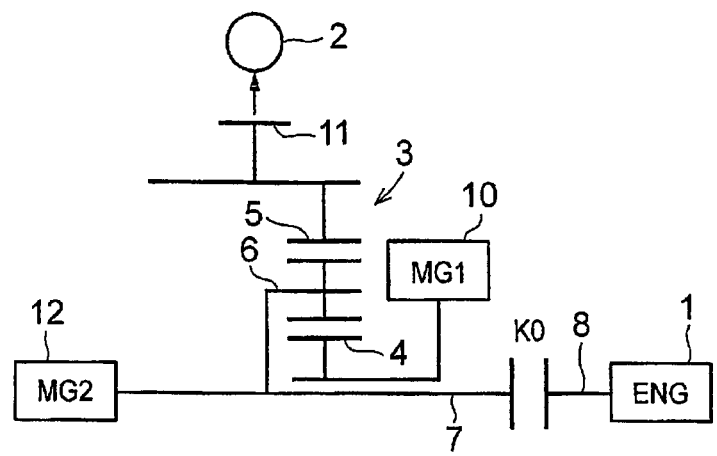
FIG. 13 is a block diagram that shows yet another example of a powertrain of a vehicle to which the invention is applicable.

FIG. 13 shows an example of a powertrain in which, in the above-described configuration shown in FIG. 8, the second motor 12 is coupled to the carrier 6 of the power split mechanism 3 and the speed reduction mechanism 13 is omitted accordingly. A vehicle including such a powertrain is also able to travel while stopping the operation of the engine 1 and releasing the clutch K0, and is able to start up the engine 1 by controlling the clutch K0 as described above while traveling in a so-called EV travel mode. It is possible to suppress unintentional fluctuations in driving torque by controlling the MG torque as described above together with control over the clutch K0.

Figure 14:
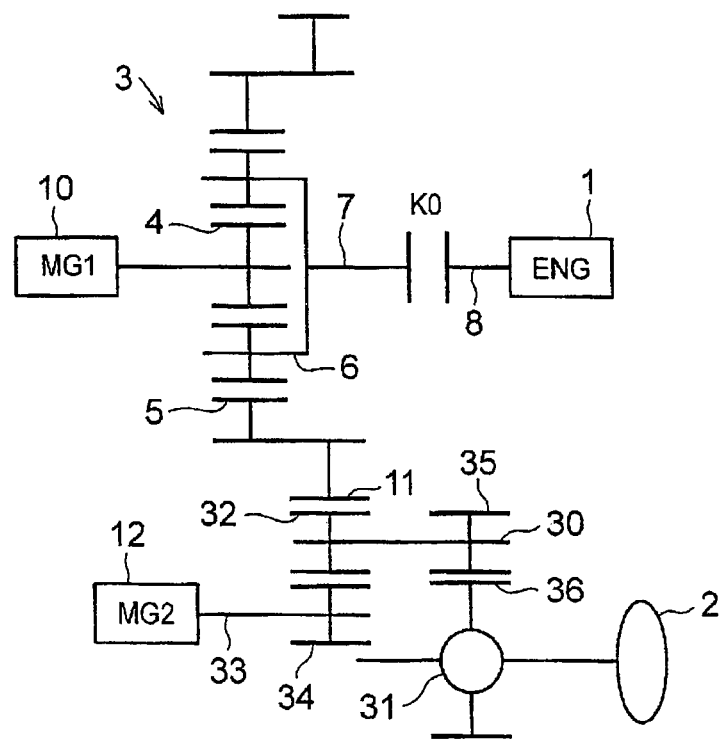
FIG. 14 is a skeletal view that shows an example of a multi-axis transaxle in a vehicle to which the invention is applicable.

FIG. 14 shows an example of a multi-axis transaxle in a vehicle to which the invention is applicable. In this example, torque is transmitted from the power split mechanism 3 to a counter shaft 30 via the output gear 11, and torque is output from the counter shaft 30 to the drive wheels 2 via a differential gear 31. That is, as shown in FIG. 14, the counter shaft 30 is arranged in parallel with the central axis of the power split mechanism 3 or the input shaft 7, and a counter driven gear 32 integrated with the counter shaft 30 is in mesh with the output gear 11. A gear 34 mounted on a rotor shaft 33 of the second motor 12 is in mesh with the counter driven gear 32, and transmits torque of the second motor 12 to the counter shaft 30. A counter drive gear 35 is provided on the counter shaft 30 so as to integrally rotate, and the counter drive gear 35 is in mesh with the ring gear 36 in the differential gear 31. Torque is transmitted from the differential gear 31 to the right and left drive wheels 2. The other configuration is similar to the configuration shown in FIG. 8, so like reference numerals in FIG. 14 denote the similar components to those in FIG. 8, and the description thereof is omitted.

What is claimed is:

1. A control system comprising:
   an engine configured to start up by cranking;
   a clutch configured to transmit cranking torque to the engine when engaged, the clutch being configured to continuously change its transmitted torque capacity; and
   an electronic control unit configured to crank the engine by setting the clutch to a half engaged state in a state where operation of the engine is stopped during traveling, the half engaged state being a state where the clutch is engaged with a slip,
   the electronic control unit being configured to, after a rotation speed of the engine has reached an ignition permission rotation speed or higher, increase the transmitted torque capacity of the clutch to a transmitted torque capacity that satisfies the following conditions i) and ii):
   i) the transmitted torque capacity increases immediately when the rotation speed of the engine has reached the ignition permission rotation speed; and
   ii) the transmitted torque capacity allows the clutch to be kept in the half engaged state.

2. The control system according to claim 1, wherein when the rotation speed of the engine falls within a resonant region, which is a predetermined region lower than the ignition permission rotation speed, the electronic control unit is configured to set the transmitted torque capacity to a transmitted torque capacity that satisfies the following conditions iii) and iv):
   iii) the transmitted torque capacity allows the clutch to be kept in the half engaged state; and
   iv) the transmitted torque capacity is larger than a transmitted torque capacity at the time when the rotation speed of the engine increases to exceed the resonant region and is lower than the ignition permission rotation speed.

3. The control system according to claim 1, further comprising a motor directly coupled to a drive wheel, the drive wheel being configured such that driving torque is transmitted from the engine to the drive wheel, wherein
   the clutch is arranged so as to transmit the driving torque from the engine to the drive wheel or interrupt transmission of the driving torque from the engine to the drive wheel, and
   the electronic control unit is configured to, when the transmitted torque capacity of the clutch is changed, control torque of the motor so as to suppress a change in torque at the drive wheel due to the change in the transmitted torque capacity.

4. The control system according to claim 1, further comprising:
   a motor coupled to an output side of the engine via the clutch; and a transmission mechanism coupled to an output side of the motor, the transmission mechanism being configured to change its speed ratio.

5. The control system according to claim 1, further comprising:
a motor coupled to an output side of the engine via the clutch; and
a transmission mechanism coupled to an output side of the motor via the clutch, the transmission mechanism being configured to change its speed ratio.

6. The control system according to claim 1, further comprising:
a transmission mechanism including at least three rotating elements serving as an input element, an output element and a reaction element, the rotating elements being configured such that a rotation speed of one of the rotating elements is determined on the basis of rotation speeds of the other two rotating elements; and
a first motor coupled to the reaction element, wherein
the engine is coupled to the input element via the clutch.

7. The control system according to claim 6, further comprising:
a second motor coupled to the output element.

8. The control system according to claim 3, further comprising:
a transmission mechanism configured to output torque to the drive wheel, the transmission mechanism being configured to change its speed ratio, wherein
the motor is coupled to an input side of the transmission mechanism, and the engine is coupled to the motor via the clutch.

9. The control system according to claim 3, further comprising:
a transmission mechanism configured to output torque to the drive wheel, the transmission mechanism being configured to change its speed ratio, wherein
the motor includes:
a first motor arranged between the engine and the clutch; and
a second motor arranged between the clutch and the transmission mechanism, and
when the transmitted torque capacity of the clutch is changed, the motor that is controlled so as to suppress a change in torque at the drive wheel as a result of the change in the transmitted torque capacity is the second motor.

10. The control system according to claim 3, further comprising:
a transmission mechanism including at least three rotating elements serving as an input element, an output element and a reaction element, the rotating elements being configured such that a rotation speed of one of the rotating elements is determined on the basis of rotation speeds of the other two rotating elements, wherein
the motor is coupled to the reaction element, and
the engine is coupled to the input element via the clutch.

11. The control system according to claim 3, further comprising:
a transmission mechanism including at least three rotating elements serving as an input element, an output element and a reaction element, the rotating elements being configured such that a rotation speed of one of the rotating elements is determined on the basis of rotation speeds of the other two rotating elements, wherein
a plurality of the motors include:
a first motor coupled to the reaction element; and
a second motor coupled to the output element,
the engine is coupled to the input element via the clutch, and
when the transmitted torque capacity of the clutch is changed, the motor that is controlled so as to suppress a change in torque at the drive wheel as a result of the change in the transmitted torque capacity is the second motor.

12. A control method for a vehicle, the vehicle including an engine, a clutch and an electronic control unit, the engine being configured to start up by cranking, the clutch being configured to transmit cranking torque to the engine when engaged, the clutch being configured so as to continuously change its transmitted torque capacity, the control method comprising:
cranking, by the electronic control unit, the engine by setting the clutch in a half engaged state in a state where operation of the engine is stopped during traveling, the half engaged state being a state where the clutch is engaged with a slip; and
after a rotation speed of the engine has reached an ignition permission rotation speed or higher, increasing, by the electronic control unit, the transmitted torque capacity of the clutch to a transmitted torque capacity that satisfies the following conditions i) and ii):
i) the transmitted torque capacity increases immediately when the rotation speed of the engine has reached the ignition permission rotation speed; and
ii) the transmitted torque capacity allows the clutch to be kept in the half engaged state.

* * * * *